United States Patent

Lunsford, Jr. et al.

[11] 3,841,836
[45] Oct. 15, 1974

[54] APPARATUS FOR THE PRODUCTION OF CONDENSATION POLYMERS

[75] Inventors: Marvin C. Lunsford, Jr., Kingsport; David T. Bowers, Chuckey; Sherwood M. Caldwell, Kingsport; Leonard P. Davis, Kingsport; Ted L. Roach, Kingsport, all of Tenn.

[73] Assignee: Eastman Kodak Company, Rochester, N.Y.

[22] Filed: Aug. 10, 1972

[21] Appl. No.: 279,556

[52] U.S. Cl............... 23/253 A, 23/252 R, 23/283, 23/285, 23/288 R, 23/288 E, 34/171, 260/75 M, 261/110

[51] Int. Cl...... B01d 19/00, B01j 1/00, C08g 17/00

[58] Field of Search.... 23/252 R, 253 A, 259.1 UX, 23/283, 284, 285, 288 E, 288 R; 34/171, 172, 178; 137/92; 159/18 US; 202/158 US; 260/75 M, 698; 261/109, 110, 114 R US

[56] References Cited
UNITED STATES PATENTS

| 415,167 | 11/1889 | Greene | 34/172 X |
|---|---|---|---|
| 455,893 | 7/1891 | Wiesebrock | 261/114 R |
| 1,941,499 | 1/1934 | Siems | 23/283 |
| 2,126,168 | 8/1938 | Breuchaud | 34/69 |
| 2,621,112 | 12/1952 | Schmalenbach | 23/284 |
| 3,250,747 | 5/1966 | Mitchell et al. | 23/285 |
| 3,503,937 | 3/1970 | Allen et al. | 260/75 M |

Primary Examiner—Joseph Scovronek
Assistant Examiner—Barry I. Hollander
Attorney, Agent, or Firm—Elliott Stern; Cecil D. Quillen, Jr.

[57] ABSTRACT

Method and apparatus for the production of condensation polymers having a predetermined final viscosity which comprises flowing a prepolymer having an initial viscosity over a series of variable sloped surfaces in a descending path under polymerization conditions; determining the viscosity of the polyester; adjusting the slope of said variable sloped surfaces in accordance with said viscosity so as to control the residence time of the polymer flowing over the surfaces; continuously sensing the weight of the polyester flowing over the variable sloped surfaces and continuously adjusting the slope of the variable sloped surfaces so as to increase the slope thereof whenever the weight of the polyester thereon exceeds a predetermined weight and decreasing the slope thereof whenever the weight of the polyester thereon falls below a predetermined weight thereby producing a polyester having a predetermined final viscosity.

9 Claims, 4 Drawing Figures

APPARATUS FOR THE PRODUCTION OF CONDENSATION POLYMERS

This invention relates to a process and apparatus for the production of linear polyesters or copolyesters prepared from intermediate ester products of one or more dicarboxylic acids or their ester forming derivatives and one or more glycols. More particularly this invention relates to an improved reactor system particularly adapted for the production of polyesters and copolyesters by condensation.

Film- and fiber-forming polyesters prepared from dicarboxylic acids and glycols are conventionally prepared in a plurality of reactors, the first reactor being used for the preparation of an intermediate molecular weight prepolymer and one or more additional reactors being used for the further polymerization to a final polymer of high molecular weight. The particular type of a reactor upon which this invention improves (see U.S. Pat. No. 3,250,747) is characterized in that a prepolymer which enters the polymerization reactor having a low molecular weight and low viscosity is overflowed from the top of the reactor over a series of evaporative surfaces mounted so that the liquid prepolymer flows as a thin film across the major portion of each surface, which may or may not be in the form of a tray, and then drops upon the next surface below, all of the surfaces being at substantially uniformly low pressure. Usually in the preparation of polyesters by this manner, the prepolymer will have an inherent viscosity of about at least 0.2 as measured in a solution of 40 percent tetrachloroethane and 60 percent phenol. As the polyester flows down the polymerization reactor surfaces, the molecular weight, viscosity (absolute and flow) and the inherent viscosity of the polymer increases until it has attained the final desired molecular weight, viscosity or inherent viscosity.

Although these prior known gravity-feed type reactors have been used to produce a usable linear polyester or copolyester, they still leave much to be desired. For example, one problem which has been encountered using these reactors, is that quite often the viscosity of the prepolymer entering the polymerization reactor varies thus resulting in a final polymer having either too high or too low a viscosity. Heretofore, those working in the polymerization art have attempted to minimize this problem by maintaining the viscosity of the prepolymer entering the final polymerizer at a constant value. Not only is this extremely difficult to do, but it requires an excessive amount of equipment and skilled labor which greatly increases the cost of the system. Another shortcoming of the prior known reactors is that they are not readily adaptable for use in the manufacture of a plurality of polymerization products. That is, to change from the production of one polymer to another requires that an excessive amount of labor and modification of equipment be undertaken.

Therefore, it is an object of this invention to provide a polymerization system which will produce a uniform product from a prepolymer having an inherent viscosity which may vary over a wide range.

Another object of this invention is to provide a polymerization system which is readily adaptable for use in the manufacture of a number of products having widely varying physical and chemical properties.

These and other objects and advantages of this invention will become apparent from the following specification, drawings and claims.

According to this invention it has been found that superior results are obtained by using a polymerization system comprising the use of reactor trays that can be continuously adjusted to different angles with respect to the horizontal axis thereby permitting the control of the residence time and/or film thickness of the polymeric material flowing over them under the influence of gravity. It has been found that the polymers of interest have final flow viscosities in the range of about 20,000 to about 2,000,000 centipoise. The more viscous materials flow more slowly for a given tray angle and therefore build up a thicker film and receive a longer residence time. The adjustability of the trays permits proper selection of the tray slope for the material being produced at any given time. Thus it has been found that in preparing polyesters the final polymerization reactor should contain trays the slope of which are variable so as to enable the control of the residence time of the polymer in the reactor, thereby controlling the final viscosity and therefore inherent viscosity of the product. The polymerization reactor of this invention advantageously contains a series of trays, plates or equivalent surfaces over which the material to be polymerized flows by gravity alone in a thin layer, the glycol (alkane diol) being given off and removed to an exhaust system.

A more complete understanding of the invention will be had from an examination of the following detailed description and drawings wherein FIG. 1 is a simplified representation of one form of condensation equipment;

Figure 1:
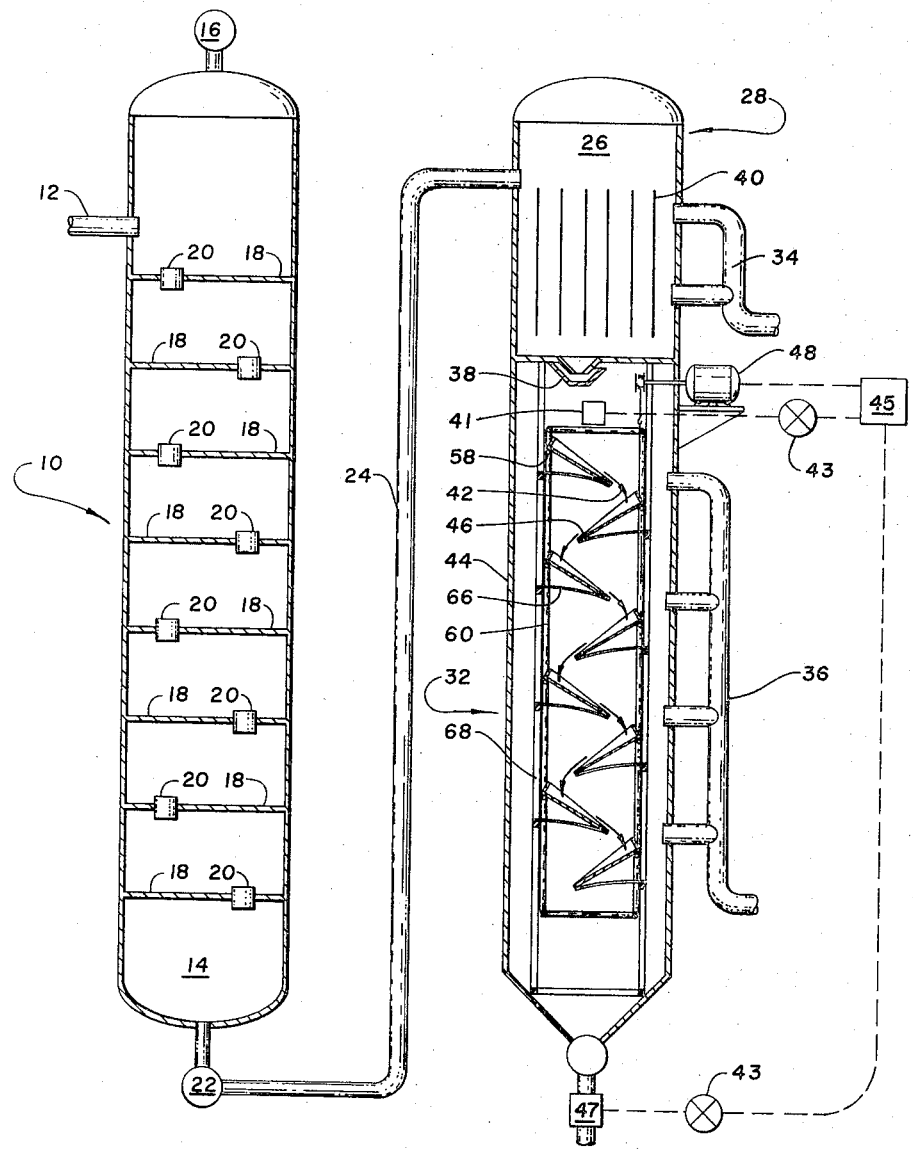

Referring first to FIG. 1, the reagents from which the polyester is prepared are fed in a molten stream into a prepolymerizer unit 10 through inlet 12. The prepolymerizer unit is illustrated as a vertical reactor column having a plurality of trays and overflow pipes located at spaced intervals along its interior surface. The prepolymer unit is normally heated by suitable means (not shown) to a temperature within the range of from 180° to 280°C. The temperature employed at this point is determined in a known manner by the ratios of the reagents fed to this reactor. A preferred temperature is within the range of 200°–250°C. This prepolymerizer unit is also normally operated under a pressure of 0 to 150 pounds per square inch gauge (hereafter referred to as "psi"). Preferably the pressure employed is 0 to 50 psi. The pressure is maintained by any suitable means such as, for example, by a pressure control system 16 which permits a predetermined amount of the methanol evolved in the alcoholysis stage to escape but retains enough to establish the desired pressure.

The reagents feed into the prepolymerizer unit 10 pass down through the reactor by covering the plates 18 and flowing through the overflow pipes 20 onto the next lower plate until it reaches the bottom zone 14. From the bottom zone 14 the reagents, which have now been formed into an alcoholysis product, are delivered by a pumping means 22 from the prepolymer unit through heated conduit 24 to the top zone 26 of an intermediate polymerizer unit 28. Preferably this intermediate polymerizer unit is operated under a vacuum and is heated by suitable means (not shown) to a temperature of between about 260° to 330°C. A preferred temperature range is 270–300°C.

As illustrated in FIG. 1, the intermediate polymerizer unit 28 may be attached to the final polymerizer unit 32 so that each unit has independent vacuum systems. These independent vacuum systems are depicted by manifolds 34 and 36. The two sections may be separated by any suitable means so as to maintain the two sections at different pressures such as by using a liquid seal 38 on which the liquid consists of molten polymer. The intermediate polymerizer unit section 26 is maintained at 0.5 to 50 torr, preferably at 0.5 to 5 torr, and the molten low molecular weight polymer is distributed over suitable means, such as vertical bundle of tubes 40, so as to present the maximum surface area to the vacuum. The polymer then passes through the liquid seal 38 into the final polymerizer unit 32 which is maintained at a pressure of from about 0.2 to 1.5 torr. The polymer at this point is preferably an intermediate molecular weight polyester or copolyester which may include some low molecular weight constituents having as few as four repeating units. Preferably, the polymer will normally have an inherent viscosity of about 0.35–0.90.

After the polymer passes through the liquid seal 38 it drops onto a plurality of variable sloped means for conducting the flow of the polymer in a vertically descending path 42 at a controlled rate, the variable sloped means being adjustably supported within the reactor housing means 44. FIG. 1 shows one suitable variable sloped means as a plurality of trays 46 adjustably supported in the interior of the reactor. The polymeric material flows across the first adjustable tray, drops onto the second, and so on until it reaches the bottom where it is pumped out of the reactor.

Figure 2:
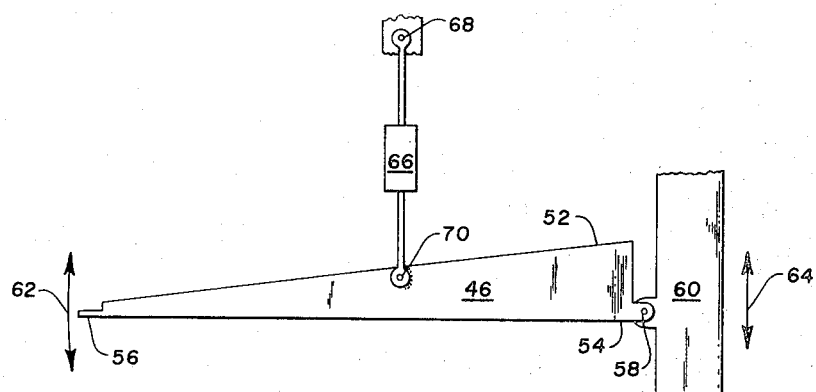
FIG. 2 is a schematic representation of the variable tray means of this invention.

One of the plurality of possible tray assemblies making up the variable sloped means of this invention is shown schematically in FIG. 2. The tray 46 is illustrated as having sloped (optional) sides 52 which are tapered from the rear edge 54 toward the discharge edge 56 of the tray. The rear edge 54 of each tray is pivotably attached by hinge means 58 to a support surface means 60. Thus, each tray of the variable sloped means is mounted so that the discharge end 56 thereof may be raised or lowered in reference to the horizon as indicated by arrowheads 62. The support surface means 60 to which the hinge means 58 is attached is adapted to be moved vertically thereby permitting the hinge point of the rear edge of the tray to be moved in a vertical direction as indicated by arrow-heads 64. Weight responsive means 66, which is operably connected to the variable sloped means may be a spring, weight sensor and solenoid, dash pot, combinations thereof, or the like, is attached by suitable means to a point 68 on the reactor and to a point 70 on the tray 46. As will be appreciated, the weight responsive means 66 may be mounted above or below the tray, depending on the type of weight responsive means used, and either to the right or left of the hinge means 58.

The operation of the variable sloped means and its function within the reactor system can be explained substantially as follows:

The rate of flow and depth of the polymer in the sloped trays are dependant upon the angle of inclination of the tray surface or channel from the horizontal. In polymer production both of these variables are important. The rate of flow determines the hold-up time in this part of the reaction. The polymer depth determines the rate of the liberation of diol (e.g. ethylene glycol) being evolved. Thus, both the rate of flow and polymer depth determine the degree to which the reaction is allowed to proceed. The weight responsive means 66 which supports the front of the tray 46 maintains constant mass on the tray surface and thus constant depth for a given tray and polymer density. This equilibrium weight is determined by the equivalent "spring constant" or weight response transfer function chosen for the support element. The pivoting fulcrum or hinge means 58 which supports the back of the tray is raised or lowered by the support surface means 60 to give an initial angle setting to the tray surface which is dependant upon the flow properties of the material being processed. The weight responsive means 66 then works to compensate for small flow perturbations while the pivot point may be reset automatically to account for changes in the incoming properties of the material. Neither of these mechanisms is sufficient alone to adequately control final material properties.

The overall variable tray assembly is illustrated in FIG. 1 wherein the trays are supported and their slopes controlled. The raising and lowering of the plates may be accomplished by a motor and pulley arrangement 48 attached to the support surface means 60. The raising and lowering of this subassembly can be controlled manually, but is preferably controlled by a means for sensing and continually adjusting the variable sloped means. This means continuously adjusts the slope of the trays in response to the viscosity (which is a function of the inherent viscosity and temperature) of the polymer flowing through liquid seal 38 and over the trays and is optionally responsive to the absolute viscosity of the polymer leaving the polymerizer. Therefore, if the viscosity of the polymer leaving the liquid seal 38 is too high the flow responsive means automatically varies the slopes of the trays so that the residence time of the polymer on each tray is reduced and therefore the total residence time of the polymer in the reactor is also reduced. The flow responsive means depicted in FIG. 1 is comprised of a feed forward viscosity sensing means 41 and feed back viscosity sensing means 47 the signals of which are transmitted by the signal transmitting means 43 to a control means 45 which interprets the signals received from the viscosity sensing means 41 and 47 and translate the signals into positive or negative adjustment which in turn drives the motor and pulley arrangement 48. The actual amount of adjustment made depends of course on the polymer being prepared and the desired final viscosity of the polymer.

Figure 3:
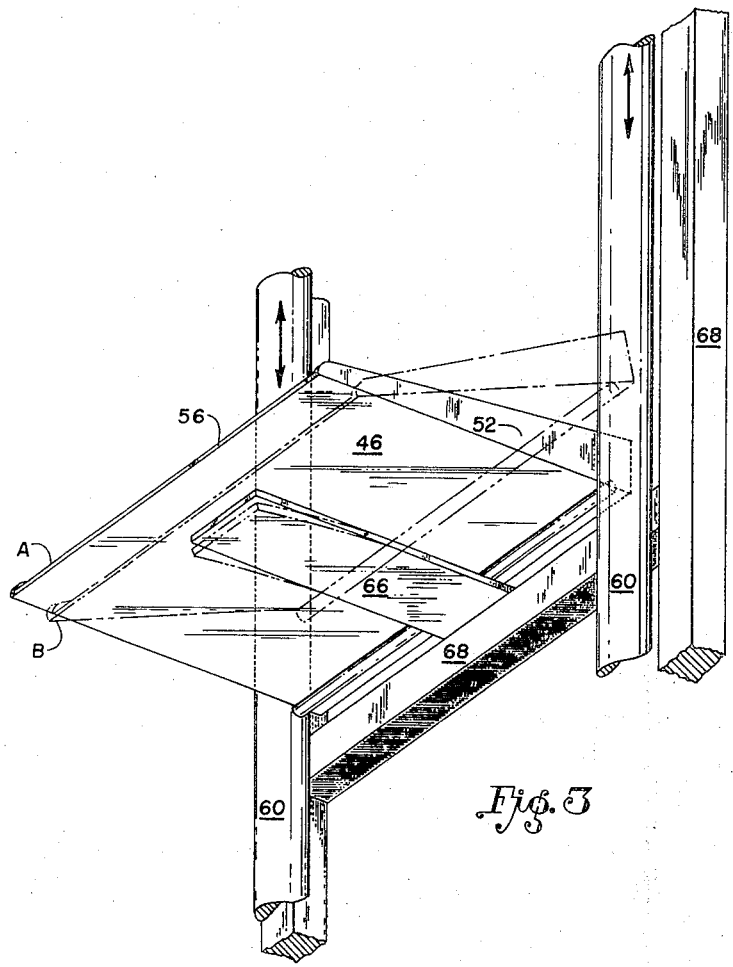
FIG. 3 is a fragmentary isometric view showing portions of the apparatus appearing in FIG. 1.

Further details of one specific variable slope tray which has been found especially useful are shown in FIG. 3. One position designated A of a plate is shown by solid lines and a position designated B of the plate after adjustment is shown by the phantom lines.

In the configuration the weight responsive means 66 is a leaf spring attached at one end to a fixed frame 68.

The movable support surface means 60 is shown as a pair of rods slidably mounted on the fixed frame 68. As mentioned hereinabove the final polymerizer unit 32 is normally operated at a reduced pressure. Since the polymeric material passing through the seal advantageously has an inherent viscosity of from about 0.40 to 0.90, very little glycol has to be removed for an inherent viscosity increase to the desired value. For example, 1 to 2 percent of glycol, based on the weight of product, may be removed in the lower zone. Since only small quantities of glycol are removed as vapors, it is easy to maintain a low pressure, usually 0.05–0.5 torr, which is advantageous for fast reaction rates or for high molecular weights. The entire polymerizer may be heated by circulating a heat transfer agent through a jacket. Rather than using an external vacuum trap system shown in FIG. 1, an axially positioned central tube may be used. Due to its location the latter may be kept sufficiently hot to prevent plugging of the line by solidifying of entrained polymer being drawn off.

Figure 4:
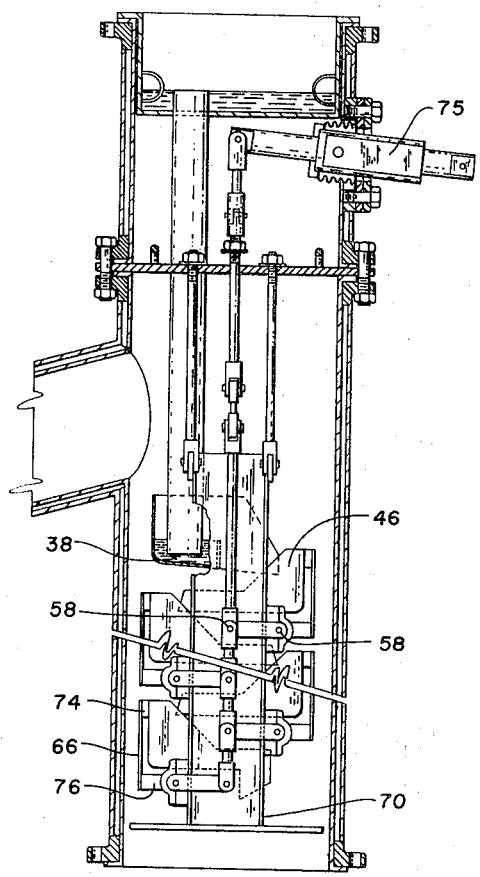
FIG. 4 is a schematic cross-section view in profile of a preferred embodiment of the polymerization apparatus covered by this invention in which the inventive process is accomplished.

Referring now to FIG. 4 which is a preferred embodiment of the apparatus of this invention, the first tray lift system provides a pivoting fulcrum 58 for the trays 46 as well as providing positive raising and lowering to set the tray angle of means of a vertical lift mechanism 75. The weight responsive means is a spring support system (linear or nonlinear). It consists of a rectangular frame 70 to support the spring 66, a linkage 74 from the tray 46 to the spring 66 and a linkage 76 from the spring to the frame 70. These two assemblies fit together as shown in FIG. 4 to make the operational device. The first subassembly provides for feed forward control (reset, continuous or real time) of tray slopes to correct for changes in physical properties of the materials entering and leaving the device. This is controlled by open and/or closed loop control with automatic positioning (not shown). The weight responsive means provides cybernetic control of tray slopes to correct for perturbations in flow, keeping mass on the tray constant. Both systems are essential for the proper operation of the apparatus.

Any type of weight responsive element (linear or nonlinear) may be used to provide the support of the front of the trays (e.g., helical springs, leaf springs, dash pots, weight sensor and solenoid, torsion springs, and combinations and permutations thereof). The support of the rear of the tray may be provided by pivot pin, ball joint, or any device which exhibits one or more rotational degrees of freedom but fewer than three translational degrees of freedom with the constrained translational degree of freedom being in the vertical direction. The lift mechanism may be motorized jack, hydraulic or pneumatic cylinder, solenoid or similar electromagnetic device, or other mechanical or mechanically related device which performs the desired functions, with control being either fully automatic or manually activated. This lift control may consist of one mechanism with linkage to move all trays at once or may be comprised of many units which control one or more trays independently.

The first tray-lift system also allows the same reactor to process different materials which may have widely varying physical properties and/or widely varying residence time requirements.

The process and apparatus by which the invention is performed is described hereinabove in its simplest form. Several modifications of the apparatus will be obvious to those skilled in the art. In one convenient modification, one, two or even more small intermediate reactors are introduced into the feed line connecting the prepolymerizer to the intermediate polymerizer. In these intermediate reactors the temperature is progressively increased and the pressure progressively reduced. In this way the stream of reaction product from the prepolymerizer is more gradually heated to the temperature of the polymerizer and the pressure to which the reaction product is subjected in the prepolymerizer is more gradually changed to the vacuum to which it is subjected in the polymerizer. It is emphasized that there is a best or optimum set of slopes for the trays for any given material being produced. This invention permits the selection of the optimum slope of the trays for the production of any given material. As the material flows over the trays, the polycondensation process proceeds to yield a flow viscosity increase that is exponential in nature with respect to time of reaction (or the number of trays over which it has flowed). If desired, each tray could have an individual adjustment. Too shallow a slope of the trays is undesirable for two reasons: (1) a thick film is created which retards reaction because of the increased diffusion of the product of polycondensation (surface to volume ratio becomes small) and (2) the thick film yields too much residence time permitting excessive thermal degradation of the material being processed.

From the above description it can be readily seen we have provided a novel process and apparatus for the preparation of polyesters. Any of the polyesters and copolyesters known in the art can be prepared using this invention, i.e., those described in U.S. Pat. Nos. 2,465,319; 2,720,502; 2,901,466; 3,157,619; 3,018,272; 3,546,008; 3,669,921; etc.

Any of the well-known catalyst systems known in the art such as titanium isopropoxide may be employed, although the process is not limited to the use of any particular catalyst. Other suitable catalysts include those described in U.S. Pat. Nos. 2,465,319; 2,720,520; and 2,727,881; among such catalysts which can be used are zinc acetate, manganese acetate, manganese benzoate, isopropyl titanate, antimony trioxide, magnesium propionate, a combination of such catalysts as lithium acetate, sodium hydroxide, or both of these with aluminum isopropoxide, manganese acetate, and magnesium-titanium butoxide, etc. Titanium dioxide, silica, carbon black and other similar inorganic pigments may also be included in the reaction mixture as well as stabilizers, antioxidants, dyes, etc.

Although the invention has been described with particular reference to certain preferred embodiments thereof, variations and modifications can be effected within the spirit and scope of the invention.

We claim:

1. Apparatus for the production of condensation polymers having a predetermined final viscosity comprising a. housing means having a polymer inlet and polymer outlet, b. variable slope means for conducting a flow of polymer in a descending path from said polymer inlet to said polymer outlet, said variable means being adjustably supported within said housing means, c. adjustment means operably connected to said variable slope means for adjusting the initial slope thereof, d. polymer sensing means operably connected to said adjustment means for continuously sensing the viscosity of the polymer and adjusting the slope of said variable slope means in response thereto so as to maintain the residence time of the polymer flowing over said variable slope means for a period sufficiently long to prepare a polyester having a predetermined final viscosity; and e. weight responsive means operably connected to said variable slope means for continuously sensing the weight of the polymer on said variable slope means and increasing the slope thereof whenever the weight of the polymer thereon exceeds a predetermined weight and decreasing the slope thereof whenever the weight of the polymer thereon falls below a predetermined weight.

2. Apparatus according to claim 1 wherein said polymer sensing means is located so as to sense the viscosity of the polymer flowing through the polymer outlet.

3. Apparatus according to claim 1 wherein said polymer sensing means is located so as to sense the viscosity of the polymer flowing through said polymer inlet.

4. Apparatus according to claim 1 wherein said polymer sensing means is located so as to sense the viscosity of the polymer flowing through said polymer inlet and said polymer outlet.

5. Apparatus according to claim 1 wherein said variable slope means is a plurality of tray means arranged in a vertically stacked configuration, said variable tray means being pivotably mounted at one edge within said housing means.

6. Apparatus according to claim 5 wherein said weight responsive means is a spring means.

7. Apparatus according to claim 6 wherein said weight responsive means is a leaf spring.

8. Apparatus according to claim 7 wherein said leaf spring is mounted in a cantilevered manner from said housing means with the free end thereof flexibly supporting said tray means.

9. Apparatus according to claim 7 wherein said leaf spring is mounted substantially vertical, the tray means being flexibly supported by said leaf spring.

* * * * *